Figures 1, 2:
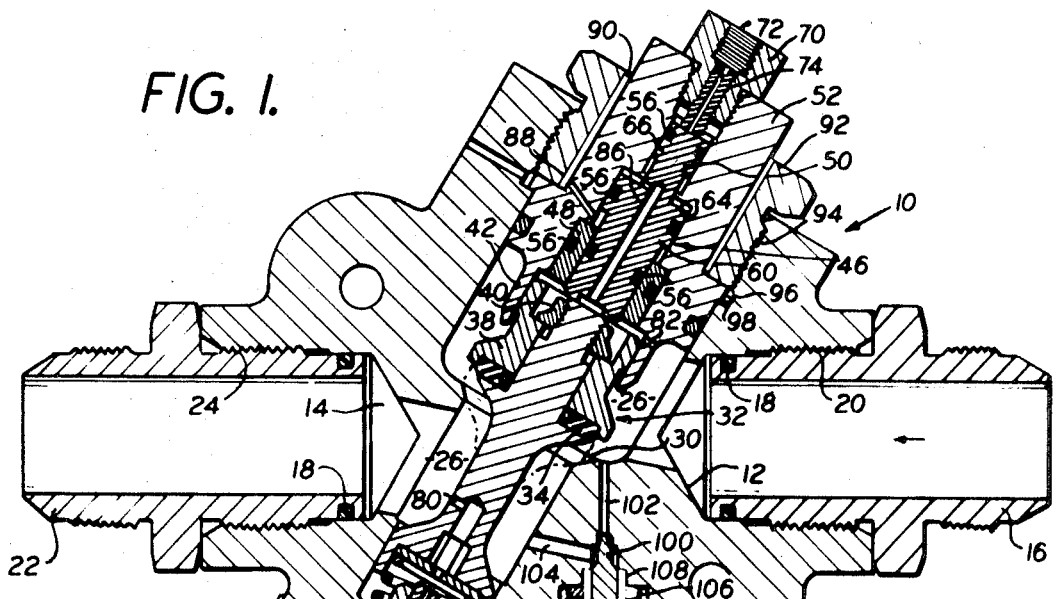

United States Patent

[11] 3,621,873

| [72] | Inventors | John G. Kenann<br>Chatham;<br>Joseph Detaranto, Jr., Parsippany, both of N.J. |
|---|---|---|
| [21] | Appl. No. | 839,969 |
| [22] | Filed | July 8, 1969 |
| [45] | Patented | Nov. 23, 1971 |
| [73] | Assignee | Marotta Valve Corporation<br>Boonton, N.J.<br>Continuation-in-part of application Ser. No. 284,148, May 29, 1963, now abandoned.<br>This application July 8, 1969, Ser. No. 839,969 |

[54] PNEUMATIC FUSE
12 Claims, 2 Drawing Figs.
[52] U.S. Cl. .................................................. 137/495,
137/460, 137/462, 137/498, 137/554, 251/67,
251/282
[51] Int. Cl. ...................................................... F16k 31/12
[50] Field of Search .......................................... 137/460,
469, 498, 517, 519, 519.2

[56] References Cited
UNITED STATES PATENTS

| 746,640 | 12/1903 | Locke | 137/460 |
|---|---|---|---|
| 1,395,586 | 11/1921 | Krichbaum | 137/460 |
| 2,950,730 | 8/1960 | Svensson | 137/116.3 |
| 3,085,589 | 4/1963 | Sands | 137/498 |

Primary Examiner—Harold W. Weakley
Attorney—Sandoe, Hopgood & Calimafde

ABSTRACT: The open position of this pneumatic fuse valve is adjustable to change the rate of fluid flow at which the valve closes. The valve has static pressure balance when opened regardless of the pressure in the pipeline and even though the valve has a connection with the space surrounding the outside of its housing for inserting a means for overriding the actuator. This pressure balance permits adjustment of the valve when there is fluid pressure in the line and it permits the valve to be closed by a small force. A bleed connection equalizes pressure on both sides of the valve to permit it to open after the high rate of fluid flow that closed it has been shut off.

PATENTED NOV 23 1971 3,621,873

INVENTORS
JOHN D. KEENAN
JOSEPH DITARANTO, JR.
BY
Emery, Whittemore,
Sandoe & Graham
ATTORNEYS.

PNEUMATIC FUSE

RELATED PATENT APPLICATION

This application is a continuation of our copending application Ser. No. 284,148, filed May 29, 1963 and now abandoned for Pneumatic Fuse.

BACKGROUND AND SUMMARY OF THE INVENTION

If a pipe or hose bursts between a fluid supply source and a location at which the fluid is subjected to a controlled use, it is important to shut off quickly the fluid flow.

This invention relates to apparatus for stopping passage of fluid through a conduit in the event that the rate of flow exceeds a predetermined value. The apparatus is termed a "pneumatic fuse," and this expression is used in a broad sense to designate devices for preventing excessive rates of liquid discharge as well as gas discharge.

It is an object of this invention to provide an improved pneumatic fuse including a valve element that is normally in open position, but with means responsive to the rate of flow of fluid through a passage to close the valve element when the flow rate exceeds a predetermined value, as in the case of a bursted hose or ruptured pipe downstream from the fuse. The flow rate is ordinarily determined by the pressure drop through a certain part of the passage through which the fluid travels, and in the preferred construction the flow rate is determined by the pressure drop past the valve element that controls the flow.

Another object is to provide a passage with a valve element movable into contact with the valve seat to shut off flow of fluid through the passage, and with yieldable means holding the valve element in open position against the pressure drop of the fluid flow around the valve element until this pressure drop reaches a value that corresponds with a rate of flow which the invention is intended to prevent.

Another object is to provide a pneumatic fuse with improved means for indicating the position of the valve element of the fuse, and to provide indicating means at a location remote from the pneumatic fuse.

Features of the improved construction relate to the balancing of the valve element and its actuator so that a given rate of flow produces the same pressure drop regardless of variations in static pressure of the fluid; and to apparatus for operating the valve element independently of the fluid flow. In connection with this last feature, the invention provides a combined pneumatic fuse and operator-controlled shutoff valve. Another feature relates to the unlocking of the closed valve of a pneumatic fuse when it becomes permissible to renew the flow of fluid through the passage.

Other objects, features and advantages of the invention will appear or be pointed out as the description proceeds.

In the drawing, forming a part hereof, in which like reference characters indicate corresponding parts in all the views;

FIG. 1 is a vertical sectional view through a pneumatic fuse made in accordance with this invention; and FIG. 2 is a sectional view taken on the line 2—2 of FIG. 1.

THe pneumatic fuse illustrated in the drawing includes a housing 10 having an inlet passage 12 and an outlet passage 14. There is an inlet fitting 16 which screws into the inlet passage 12 with sealing means including an O-ring 18 located in a circumferential groove in the outside surface of the fitting 16 and in position to contact with the cylindrical surface of the inlet passage 12 beyond threads 20 by which the fitting 16 is connected to the housing 10. There is a fitting 22 connected to the housing 10 by threads 24 which screw into complementary threads in the outlet passage 14 and there is an O-ring 18 for sealing against the escape of fluid around the outside of the outlet fitting 22.

The inlet passage 12 opens into a valve chamber 26 which has a tapered annular seal 30. There is a valve element 32 having a plastic face 34 which moves into and out of contact with the seal 30 to control the flow of fluid through the valve chamber 26. The valve element 32 is shown in full lines in its open position and shown in dotted lines in its closed position.

One end of the valve element has a stem portion 36 which slides in one end of the valve chamber 26 to guide the valve element, and there is a bushing 38 which fits over the stem at the other end of the valve element. This bushing 38 clamps the plastic face 34 in position, and the bushing 38 is held in assembled relation with the valve element by a nut 40 which screws over threads at the extreme upper end of the valve element 32.

One end portion of the bushing 38 slides in a bearing 42 which serves as a guide for the upper end of the valve element 32. This guide 42 also serves as a partition means restricting communication of the valve chamber 26 and the space in the guide beyond the end of the valve element to such communication as can take place through passage 82 which will be described. An actuator 46 contacts with the upper end of the valve stem and this actuator 46 has its lower portion slidable in a bushing 48 and its upper portion slidable in a cylindrical bearing 50 of an upper fitting 52. The bushing 48 fits in a counterbore in the lower part of the upper fitting 52 and there is an O-ring 56 for preventing leakage of fluid around the outside of the bushing 48. The actuator 46 has other O-rings 56 in circumferential grooves in position to contact with the bearing surface on which the actuator slides in the bushing 48 and also in the upper fitting 52.

There is a shoulder 64 at a location where the passage through the upper fitting 52 reduces in cross section for receiving an upper end portion 66 of the actuator 46 and this upper end portion 66 of the actuator slides as a piston in the reduced diameter portion of the passage through the upper fitting 52 and has an O-ring 56 for preventing leakage of fluid. An adapter 70 screws into the upper end of the passage through the upper fitting 52 and this adapter has a threaded counterbore 72 for receiving a tubing fitting and has a smaller threaded passage for receiving a screw 74 which is used for adjusting the pneumatic fuse to operate at different rates of flow.

The adapter 70 and screw 74 constitute adjusting means for changing the rate of flow at which the pneumatic fuse operates.

With the valve element 32 in the position shown in the drawing, and with fluid flowing from the inlet passage 12 and around the valve element 32 in the valve chamber 26 to the outlet passage 14, there is a pressure drop which urges the valve element 32 toward closed position but movement of the valve element 32 toward the seat 30 is opposed by a spring 76 located behind the stem portion 36 in the lower end of the valve chamber 26. The amount of pressure drop around the valve element 32 depends not only upon the rate of flow of the fluid, but also upon the spacing of the valve element 32 from the seat 30. If this spacing is reduced and the cross section for the flow of fluid is thus cut down, the pressure drop at a given rate of flow is increased. It is possible, therefore, to change the flow rate at which the pressure drop will be sufficient to overcome the force of spring 76 by changing the spacing of the valve element 32 from the seat 30.

This control of the spacing is effected by turning the screw 74 so as to move it up or down in the threads through the adapter 70. When the screw 74 is turned in a direction to move it downward it displaces the actuator 46 and pushes the stem of the valve 32 downward so that the face 34 of the valve element 32 is closer to the seat 30 when the valve element 32 is at the limit of its upward movement. Conversely, the spacing of the valve element 32 from its seat 30 can be increased by backing the screw 74 so that it permits the actuator 46 to rise higher in the upper fitting 52 as the result of the upward pressure of the spring 76.

The valve element 32 is counterbalanced by having a passage 80 and other communicating passages leading from the portion of the valve chamber ahead of the stem 36 and into the portion of the valve chamber below this guide portion 36 so that pressure is equal on both sides of the portion 36 of the stem. Similarly pressure is equalized at the upper end of the valve element 32 by having a passage 82 through which fluid in the valve chamber 26 can flow into the upper end of the bearing 42 which guides the upper part of the valve element 32. Thus the entire valve element is subject to the pressure in the chamber 26 and, when the valve is open and there is no flow, the valve element 32 is balanced regardless of what the pressure is. When fluid is flowing there is some pressure drop across the opening between the valve element 32 and the seat 30, and the valve is no longer fully pressure balanced, there being more pressure acting on the upper end than on the lower end of the valve element. This imbalance is proportional to the pressure drop caused by the flow.

The structure at the lower end of the valve element serves as partition means restricting communication of the space beyond the end of the valve element with the valve chamber to communication through the passage 80.

The actuator 46 is not so easily balanced. THe lower portion of the actuator is subjected to the inlet pressure which flows through the passage 82 and into the space between the valve element 32 and the actuator 46. The upper end of the actuator is exposed to the pressure of the ambient atmosphere around the housing 10 through an axial bore in the adjusting screw 74. Provision is made, however, for balancing the actuator 46 in such a way as to compensate for the fact that this upper portion, which is exposed to the pressure of the ambient atmosphere, is not subject to the fluid pressure of the upstream fluid as transmitted through the passage 82.

This compensation is obtained by having a passage 86 leading from the lower end of the actuator 46 and opening into the space between a portion of the actuator having a shoulder that confronts the shoulder 64 of the upper fitting 52. The area of this annular face or shoulder of the actuator 46 which confronts the shoulder 64 is equal to the effective area of the lower end of the actuator 46 which is exposed to the pressure that enters the space between the valve element 32 and the actuator 46 through the passage 82. The pressure acting on these two equal areas provides equal forces in opposing directions thus creating a balance. This compensation is insured by providing a vent passage 88 leading from the space below the enlarged diameter of the actuator 46 so that if any fluid escapes into this space below the enlarged portion of the actuator 46 it will flow through the vent passage 88 and then out through a clearance 90 around the upper fitting 52, and the pressure under the shoulder 60 cannot increase above atmospheric pressure.

Since the passages 80 and 82 are of much smaller cross section than the passages 14 and 12, sudden changes in downstream and upstream pressure are not immediately reflected in the pressures against the lower and upper ends, respectively, of the valve element 32; and this protects the valve element against closing in response to temporary pressure surges.

The upper fitting 52 is held in the housing 10 by a clamping nut 92 which screws into threads 94 in the housing 10, but which does not fit tightly around the upper fitting 52, thereby leaving the clearance 90 for the escape of fluid pressure. The clamping nut 92 holds a flange 96 of the upper fitting 10 in contact with the shoulder 98 in the housing.

The valve element 32 can be closed, regardless of the rate of flow of fluid through the valve chamber, by attaching a pressure hose to a fitting screwed into the threads 72 in the top of the adapter 70. When working fluid is supplied in this manner it flows through the axial opening in the adjusting screw 74 and presses against the upper end portion 66 of the actuator which slides in the upper fitting 52 as a piston. In this manner pressure applied to the actuator 46 will push the valve element 32 downwardly and into contact with the seat 30.

When there is pressure on the upstream side of the closed valve 32, it may be necessary to unlock the valve; that is, release it from its closed position, by equalizing the pressure on both sides of the valve, or at least bringing the pressures on opposite sides near enough to the same value to permit the spring 76 to move the valve element 32 upwardly away from the seat 30. In order to establish a downstream pressure sufficient to permit the spring 76 to open the valve element 32, there is a needle valve 100 provided in the housing 10 in position to control the flow of fluid through passages 102 and 104. The needle valve 100 slides in a bushing 106 and there is an O-ring 108 for preventing escape of fluid around the outside of the stem of the needle valve 100. The bushing 106 is clamped in the ends of a counterbore 110 in the lower side of the housing 10 by another threaded bushing 112 which screws into the counterbore. The needle valve 100 is held in closed position by a screw 114 that threads through an opening in the center of the threaded bushing 112. A cap 116 normally covers the ends of the bushing 112. This cap is retained in position by spring clips 120 that bear against the inside surface of the counterbore 110 beyond the threads of the counterbore.

When the needle valve 100 is to be opened, in order to unlock the pneumatic fuse, the screw 114 is backed away from the needle valve 100 by inserting a screwdriver through the open end of the threaded bushing 112. Fluid pressure pushes valve 100 open when screw 114 is backed off allowing trapped upstream pressure to vent downstream.

Pressure is equalized by venting upstream pressure past needle valve 100. After the pressure is sufficiently equalized on opposite sides of the valve element 32, so as to permit the spring 76 to move the valve element 32 back into open position, the pneumatic valve may be set for renewed operation by again turning the screw 114 into position to close the needle valve 100.

A plunger 124 slides in a cylindrical bearing in the lower end of the housing 10, and the plunger 124 is completely pressure balanced. Part of the plunger 124 extends into an auxiliary housing 126 attached to the lower end of the housing 10 by screws 128. The portion of the plunger 124 which is in this auxiliary housing 126 has a circumferential depression 130 which serves as a cam face when the plunger 124 moves axially, and by having this depression 130 extend around the entire circumference of the plunger 124 the operation is the same regardless of any rotation of the plunger 124 about its axis. A spring 132 in the lower end of the auxiliary housing 126 urges the plunger 124 upwardly and into contact with a sleeve 134 which is in position to be displaced downwardly by the valve element 32 when the valve element moves into closed position. Such displacement of the sleeve 134 moves the plunger 124 and causes the cam face of the plunger to displace a cam follower 138 which slides in a bearing 140 formed in the lower end of the auxiliary housing 126.

This cam follower 138 contacts at its lower end with a plunger 144 of a switch 146 connected to a powerline 148 on one side and connected with a signal lamp 150 on the other side. The lamp 150 is a signal lamp and may be at a location remote from the pneumatic fuse for notifying a watchman or other attendant that the pneumatic fuse has operated to close the fluid line and that there has been some malfunctioning of the system downstream from the pneumatic fuse.

The lamp 150 can be replaced by a bell or other type of signal or by a controller for instigating a sequential operation of apparatus which should become effective because of the excessive rate of flow of fluid through the fuse.

The lamp 150 is therefore to be considered as merely representative of apparatus operated in response to the closing of the valve element of the pneumatic fuse.

The microswitch 146 is attached to a nut 156; there being a flange 158 of the microswitch in contact with a flange 159 of the nut; and a clamping nut 160 threaded on the microswitch on the other side of the nut flange 159.

In order to adjust the microswitch with respect to the cam follower 138, the nut 156 fits over threads 162 on the lower end of the auxiliary housing 126 and there is a lock nut 164 for holding the nut 156 in any adjusted position along the threads 162.

The preferred embodiment of the invention has been illustrated and described, and the invention is defined in the claims.

What is claimed is:

1. A pneumatic fuse including a housing enclosing a valve chamber which has inlet and outlet passages for connecting the valve chamber in a fluid line in which maximum flow is to be controlled, a valve seat in the chamber surrounding a flow passage through the chamber, valve means located entirely in the housing and including a valve element and guide means in which the valve element is movable toward and from the seat to close and open said flow passage, the valve element being movable in the direction of fluid flow to close the flow passage, the opposite ends of the valve element being located on different sides of the flow passage, said valve means including also aligned guide bearings in the chamber in which the opposite ends of the valve element slide, the valve element having enlarged diameter portions on different sides of the seat and connected by a stem of reduced diameter, said portions on each side of the seat being exposed only to pressure in the valve chamber on that side of the seat, means for pressure balancing the enlarged diameter portions of the valve element on each side of the seat including a pressure-balancing chamber enclosed by said guide and the end of the valve element that slides in the guide, said end of the valve element being exposed to balancing pressure at the location where the valve element moves against the pressure in said balancing chamber as the valve element moves between open and closed positions, and means comprising a bleed passage connecting one of the balancing chambers with the valve chamber for delaying changes in the pressure in said balancing chamber whereby the fuse is insensitive to short pressure surges caused by momentary changes in downstream pressure, yieldable apparatus urging the valve means into open position, and adjustable means for changing the rate of flow at which the valve means close the flow passage, a portion of the adjusting means being accessible from outside of the housing.

2. The pneumatic fuse described in claim 1 characterized by the yieldable apparatus being a spring, and the valve element being in the path of the fluid flow and urged away from the seat by said spring, and the adjustable means including a movable abutment on the side of the valve element opposite the spring.

3. The pneumatic fuse described in claim 1 characterized by the adjusting means including an axially movable element of much smaller cross section than the valve element and extending through a wall of the housing.

4. The pneumatic fuse described in claim 1 characterized by the actuator being in the housing with the valve element and being exposed partly to pressure from outside the housing, bearing surfaces in the housing in which the actuator is slidable in the direction of movement of the valve element, said actuator having areas facing in opposite directions thereon and exposed to fluid pressure of the chamber and other areas facing in opposite directions and exposed to pressure from outside the housing.

5. The pneumatic fuse described in claim 3 characterized by an actuator in the housing, said housing having a cylindrical chamber at an end of the actuator remote from the valve element, a piston portion at one end of the actuator axially movable in said cylindrical chamber and means sealing the piston portion to prevent flow of fluid into the upper part of said cylindrical chamber from the chamber in which the valve element is located, the axially movable element of the adjusting means extending through an end wall of said cylindrical chamber and into contact with one end of said piston portion.

6. The pneumatic fuse described in claim 5 characterized by the actuator having a shoulder at the end of said piston portion, a passage from the valve chamber to a space in the housing on the side of the shoulder remote from the valve chamber, the area of said shoulder being equal to the area of an end of the actuator facing the valve chamber and exposed to the fluid pressure therein, whereby the actuator is substantially pressure balanced.

7. The pneumatic fuse described in claim 6 characterized by the housing having an intermediate cylindrical chamber in which a main portion of the actuator slides axially, and there are axially spaced sealing means at locations along the length of said main portion, and a vent extending from the intermediate cylindrical chamber at a location between said axially spaced sealing means.

8. A pneumatic fuse including a housing enclosing a valve chamber with a seat dividing the chamber into upstream and downstream portions, a valve element that closes against the seat in the direction of flow of the fluid to be controlled, resilient means for holding the valve element in open position, an actuator that limits the movement of the valve element by the resilient means to control its spacing from the seat when in open position, guides in the housing, the actuator having portions that slide as pistons in the guides, the upper end of the actuator having a head end piston portion exposed on its upper side to the pressure of the ambient atmosphere outside of the housing and on its lower side the valve chamber pressure, a piston portion of the actuator larger in diameter than the head end piston and having an upper area exposed to the upstream pressure of the valve chamber and a lower area exposed to the pressure of the ambient atmosphere, the pressure against said upper area being in a direction to urge the valve element toward closed position, and the pressure against said lower area of the large diameter piston portion that is exposed to pressure of the ambient atmosphere being in a direction to urge the valve element toward open position, and an adjustable device for holding the actuator in different positions of spacing from the seat to change the rate of fluid flow at which the valve element moves into closed position.

9. The pneumatic fuse described in claim 8 characterized by said adjustable device being threaded through an opening in the housing at one end of the guides in which the actuator slides, and said opening providing access of the ambient atmosphere to the head end piston portion.

10. The pneumatic fuse described in claim 9 characterized by said opening being in line with the direction of movement of the head end piston portion whereby a rod can be inserted through the opening to exert mechanical pressure on the head end piston portion.

11. The pneumatic fuse described in claim 10 characterized by fitting in said opening for connection with a conduit through which working fluid can be supplied to the upper end of the guides in place of the ambient atmosphere to move the actuator in a direction to shift the valve element into closed position.

12. A pneumatic fuse including a housing having a valve chamber therein and inlet and outlet passages for connecting the housing in series with a fluid line in which maximum flow is to be controlled, a valve seat in the chamber and surrounding a flow passage through the chamber, valve means in the chamber and movable toward and from the seat to close and open said flow passage, the valve means being movable in the direction of fluid flow to close the flow passage, the opposite ends of the valve means being located on different sides of the flow passage, aligned guides in the chamber in which the opposite ends of the valve means slide, all of the valve means, including said opposite ends, being exposed to the pressure in the chamber so that said valve means are substantially pressure balanced and said valve means being responsive to the rate of gas flow to move the valve means into closed position, yieldable apparatus holding the valve means in open position, adjustable means for changing the position of said apparatus to change the rate of flow at which the valve means closes the flow passage, a portion of the adjusting means being accessible from outside of the housing, the adjusting means including an axially movable element of much smaller cross section than the valve element and extending through a wall of the housing, the valve means including an actuator disposed between the axially movable element and the valve element, said actuator having substantially equal areas on opposite sides thereof exposed to fluid pressure of the chamber and substantially pressure balancing said actuator, the housing having a cylindrical chamber at an end of the actuator remote from the valve element, a piston portion at one end of the actuator axially movable in said cylindrical chamber and means sealing the piston portion to prevent flow of fluid into said cylindrical chamber from the chamber in which the valve element is located, the axially movable element of the adjusting means extending through said wall in alignment with said cylindrical chamber and into contact with the head end of said piston portion.

* * * * *